United States Patent [19]

Kleinwächter et al.

[11] Patent Number: 4,744,644
[45] Date of Patent: May 17, 1988

[54] MEMBRANE CONCENTRATOR MIRROR

[75] Inventors: Jürgen Kleinwächter; Hans Kleinwächter, both of Lörrach, Fed. Rep. of Germany

[73] Assignee: Jurgen Kleinwachter, Fed. Rep. of Germany

[21] Appl. No.: 930,795

[22] Filed: Nov. 13, 1986

Related U.S. Application Data

[63] Continuation-in-part of Ser. No. 677,223, Dec. 3, 1984, abandoned.

[30] Foreign Application Priority Data

Dec. 29, 1983 [DE] Fed. Rep. of Germany ....... 3344195

[51] Int. Cl.$^4$ .......................... G02B 5/10; G02B 7/18
[52] U.S. Cl. .................................. 350/608; 350/613; 343/840; 343/915
[58] Field of Search ................ 350/608, 613; 343/840, 343/914, 915, 912

[56] References Cited

U.S. PATENT DOCUMENTS

| | | |
|---|---|---|
| 3,056,131 | 9/1962 | McCreary ........................... 350/608 |
| 3,552,835 | 1/1971 | Benzies ................................ 350/608 |
| 3,623,796 | 11/1971 | Schweiger ........................... 350/608 |
| 4,033,676 | 7/1977 | Brantley et al. ..................... 350/608 |

Primary Examiner—Jon W. Henry
Attorney, Agent, or Firm—Laff, Whitesel, Conte & Saret

[57] ABSTRACT

A membrane concentrator mirror comprises a rigid, circular-segment-shaped frame-like basic body with a hermetically closed bottom wall, the basic body having a union device for connection with a conduit leading to a device for generating sub-pressure, a membrane being hermetically stretched over the basic body in such a way that it is deformable under the influence of a sub-pressure, and this membrane consisting of a plurality of membrane segments the outer end of which is limited in a circular segment shape, the membrane segments being connected with one another along radially extending rims. An improvement of the optical quality and a reliable connection of different membrane sections is to be achieved. To this effect the membrane segments are connected with one another in such a way that rigid, radially extending clamping profiles secure the radially extending outer rims by means of clamping devices.

7 Claims, 4 Drawing Sheets

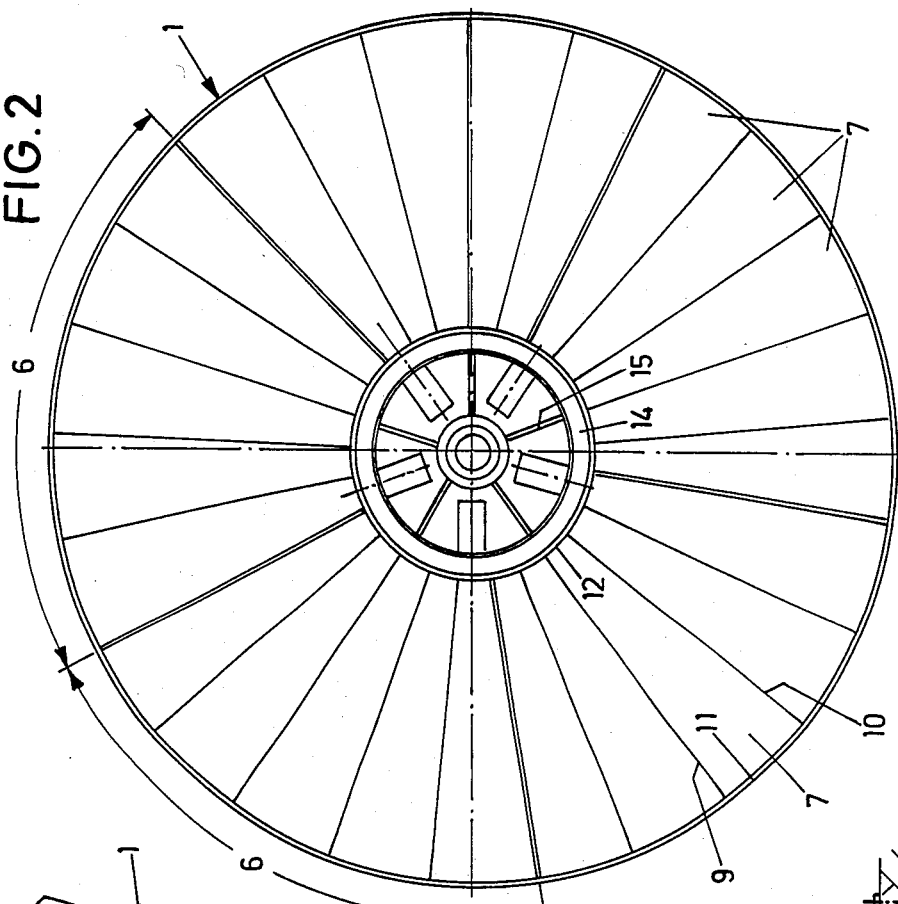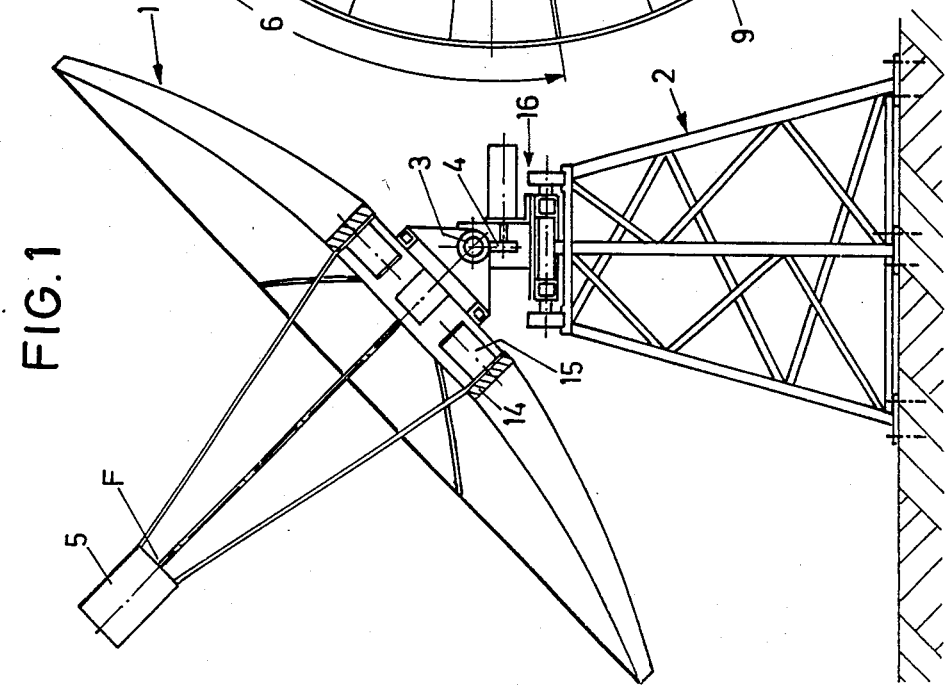

MEMBRANE CONCENTRATOR MIRROR

This is a continuation-in-part of our application Ser. No. 677,223 filed Dec. 3, 1984 and now abandoned.

FIELD OF THE INVENTION

The invention relates to a membrane concentrator mirror with a frame-like basic body, with a membrane stretched over the basic body.

BACKGROUND OF THE INVENTION

Membrane parabolic dish mirrors which are formed by the pneumatic, hydraulic, electric, magnetic or electromagnetic deformation of originally plane membranes or individual membrane sections offer the basic advantage of low weight and easy construction as compared to conventional concentrator mirrors. These advantages are especially relevant in the case of the use of such concentrator mirrors for the concentration of sun energy.

Such a membrane concentrator mirror is known from U.S. Pat. No. 4,033,676, the membrane comprising a plurlaity of membrane sections. The membrane is exclusively secured along a circular outer rim of the basic body, so that the resulting mirror configuration corresponds exclusively to the equilibrium status of membrane stress and internal sub-pressure, and air-pressure of the surrounding air, respectively.

SUMMARY OF THE INVENTION

It is an object of the invention to increase optical quality and mechanical stability, and, simultaneously, to make it feasable to build mirrors that have a circular-segment-shaped basic body instead of a drum-shaped round basic body.

According to the invention the several membrane segments are connected with one another in such a way that rigid, radially extending clamping profiles clampingly secure the radially extending outer rims by means of radially extending clamping means. The clamping profiles extend over the inside of the drum-shaped basic body to meet in the centre where they are fixed to a circular supporting construction. These clamping profiles with the accompanying clamping means do not only ensure an absolutely safe, air-tight engagement of the outer rims of the membrane segments, but they also make possible an optical correction of the equilibrium configuration through a corresponding contour of paraboloid shape, for example, Other objects, advantages and features of the present invention will appear from the detailed description of a preferred embodiment which will now be explained in conjunction with the accompanying drawings.

BRIEF DESCRIPTION OF THE DRAWINGS

FIG. 1 shows a side view of the total construction of a membrane concentrator mirror according to the invention;

FIG. 2 shows a top view of the mirror;

DESCRIPTION OF THE PREFERRED EMBODIMENTS

Figure 8:
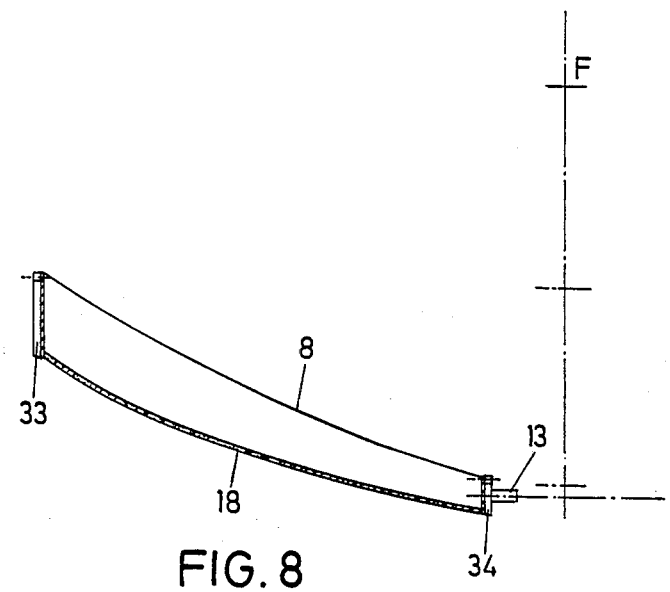
FIG. 8 shows a sectional elevation in radial direction through a segment according to FIG. 7.

FIG. 1 shows the total construction of a membrane concentration mirror 1 arranged on a support and pivotable around a horizontal axis 3 and a vertical axis 4. A receiver 5 of conventional construction is placed in the focus F of the membrane concentration mirror 1.

As can be seen from FIG. 2, the membrane concentrator mirror 1 in its top view is of the shape of a circular disk and consists of a plurality (five in the embodiment) of basic body segments.

Each basic body segment 6 consists of a plurality of membrane segments 7. The membrane segments 7, which consist of a fluor polymer foil 8 with a silver or aluminium layer, have rims 9, 10 extending radially straight in stressed condition and are limited by the circular segments 11 or 12, respectively, at their outer and inner ends.

Each basic body segment 6 has a pipe union 13 for connection with a vacuum device. The pipe union 13 is only schematically shown in FIG. 3. The several basic body segments 6 are connected with the drive means 16 on the support 2 by means of a ring 14 and support ribs 15.

Figure 7:
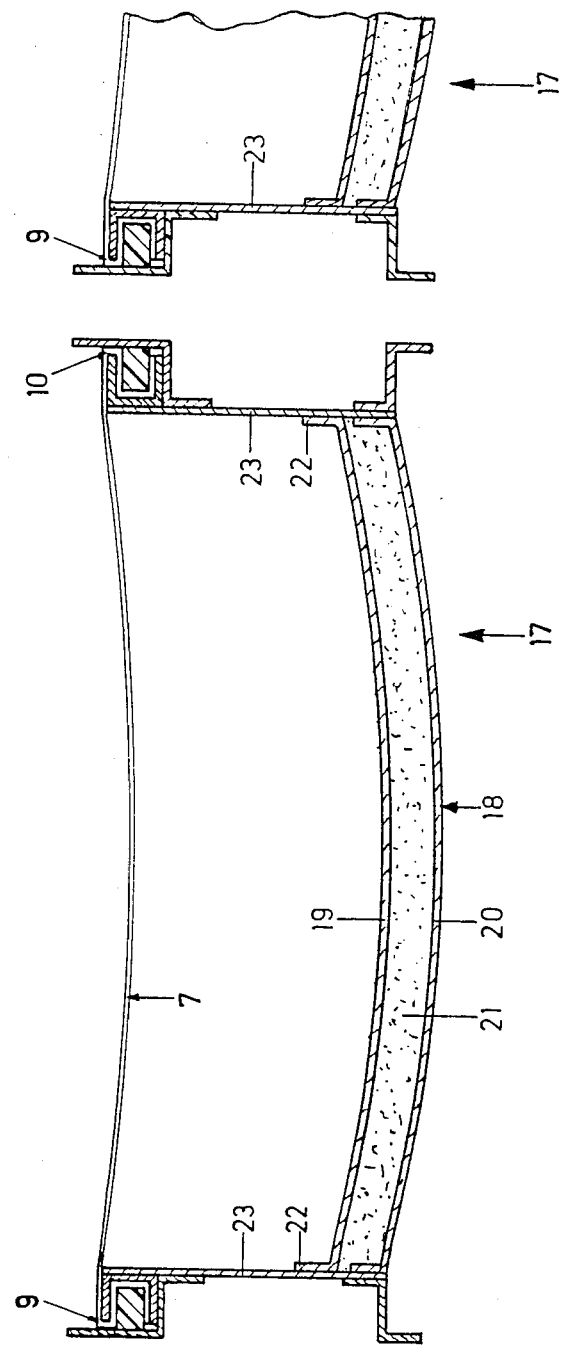
FIG. 7 shows a section according to FIG. 5 of two adjacent membrane segments before assembly.

In particular FIG. 7 shows that each basic body segment 6 consists of a plurality of basic body sections, which each form supporting bodies for the accompanying membrane sections 7. Each basic body section 17 is formed by a slightly concave bottom wall 18, which consists of two parallel aluminium sheets 19, 20 the space between which is filled with a foam 21. Each bottom wall 18 or the side-shoulders 22, respectively, of the aluminium sheets 19, 20 are connected to side-walls 23. The outer rim 9 or 10, respectively, of a membrane section 7 is secured to the side of these side-walls 23 which is turned away from the bottom wall in a manner as described below.

Figure 9:
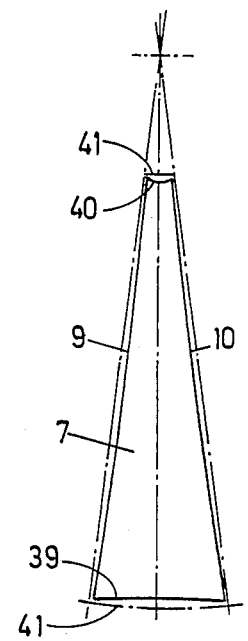
FIG. 9 shows the geometry of the cut of a membrane segment.
Figure 3:
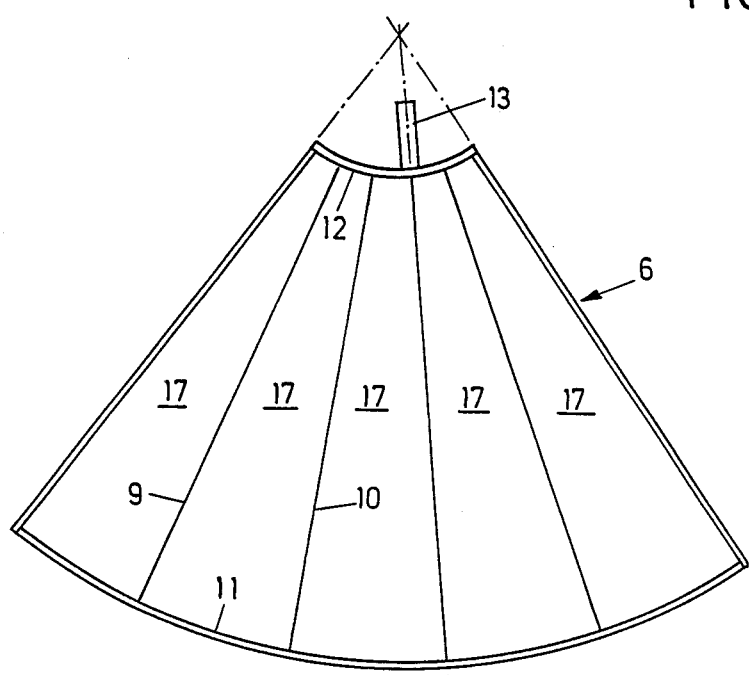
FIG. 3 shows a top view in accordance with FIG. 2 of a mirror segment.
Figure 5:
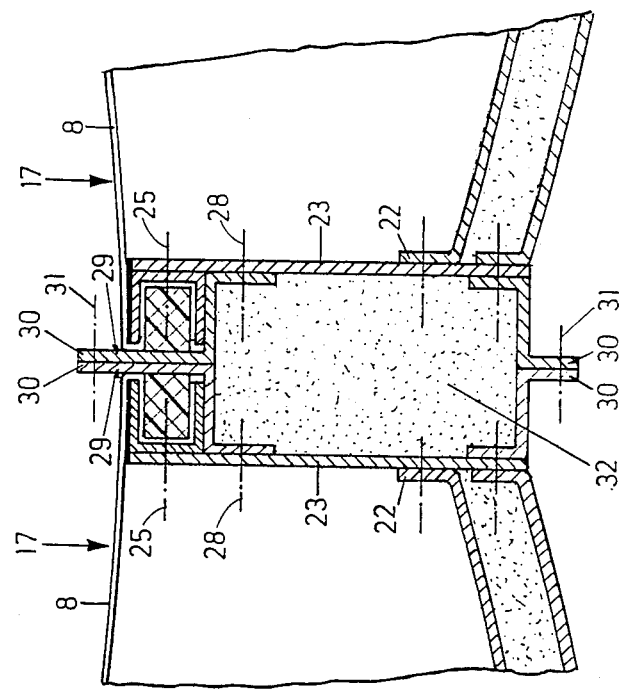
FIG. 5 shows a section through the joint area of the outer rims of two membrane segments or a clamping profile, respectively.
Figure 6:
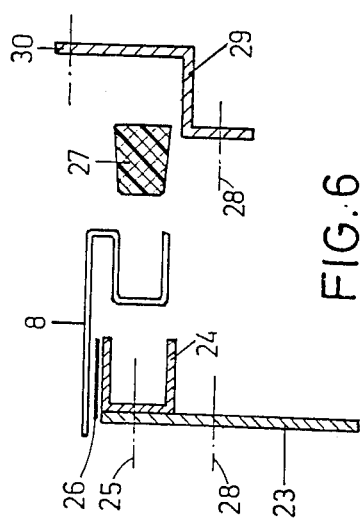
FIG. 6 is a part-sectioned representation in accordance with FIG. 5 showing the fastening of the outer rim of a membrane segment.
Figure 4:
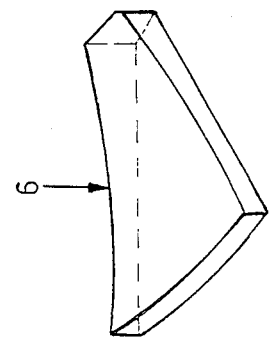
FIG. 4 is a perspective representation of the geometry of a mirror segment.

As can be seen from FIG. 5 and FIG. 6, a U-profile 24 is secured to the outer side of each side-wall 23. It may be secured by means of screws or rivets 25. On the upper side of the U-profile a tape adhesive on both sides 26 is arranged. As can be seen in particular from FIG. 6, the outer rims 9, 10 of a membrane section 7 are secured to the adhesive tape 26 in such a way that the outer rims 9, 10 the cut of which is convex as shown in FIG. 9 are stretched straight. The membrane 8 of each membrane section 7 is put into the recess of the U-profile 24 as shown in FIG. 6 and then secured by means of an elastic rod 27 made for example from rubber the contour of which is adapted to fit the U-profile 24. By means of riveting or screwing 28 as drafted in FIG. 5 and 6 an almost Z-shaped profile 29 is arranged, finally fixing the membrane section 7. Two adjacent basic body sections 17 are then connected with one another by adjoining the freely extending legs 30 of the Z-profiles 29 through screws or rivets 31. Thus, a basic body segment 6 is accomplished which may for example comprise five basic body sections 17 as shown in FIG. 3. The cavity between the adjacent basic body sections 17 is filled with foam.

It results from the afore-mentioned that each sidewall 23 is formed by a clamping profile, with each clamping device being formed by the U-profile 24 in connection with the elastic rod 27 and the Z-profile 29, and in addition the adhesive tape 26 and the screws or rivets 29, respectively.

FIG. 8 is a sectional elevation in radial direction through basic body section 17 and simultaneously a side view of a side-wall 23 and thus a clamping profile. It shows that the space to be evacuated via the pipe union 13 is formed by the bottom wall 18, the radial outer end 33 and the radial inner end 34. The upper side is formed by the membrane 8. The upper edge 35 of each side-wall 23 of each clamping profile has a parabolic configuration. Thus is achieved a very defined optical geometry of the membrane concentrator mirror 1, with the desired optimal geometry also being defined in radial direction in contrast to conventional mirrors. Only in the inner area of the several membrane sections 7 the surface geometry is predetermined by the equilibrium status of the sub-pressure in each basic body section 17, of the membrane stress and of the air-pressure of the surrounding air.

The stress distribution in each membrane section 7 is anisotropic, i.e. it differs in radial and tangential direction, the outer rims 9, 10 of the membrane cut having a convex curvature and being stretched straight when secured. The ratio of the anisotropic stress of a stretched membrane section 7 or the total stress distribution of the stretched membrane section 7, respectively, may still be influenced by curving the radial inner and outer rims 39, 40 to the inside by a certain degree and, upon stretching, by securing them in accordance with the circular-segment-shaped outer contour 41 of each basic body section 17. The securing of the outer rims 39, 40 is effected by means of a corresponding profile of the outer end 33 in the same way as the securing of the radial outer rims 9, 10.

We claim:

1. Membrane concentrator mirror comprising a rigid basic frame body with an air-tight closed bottom wall, said basic body comprising a device for connection with a conduit leading to device for generating sub-pressure, a membrane being hermetically stretched over said basic frame body said membrane being deformable under the influence of a sub-pressure, and consisting of a plurality of membrane segments and having an outer rim with a circular segment shape, said membrane segments being connected with one another along radially extending rims, characterized in that the membrane segments are connected with one another by rigid clamping profiles extending radially across said frame body, each of said clamping profiles being provided with clamping devices which secure the radially extending outer rims of adjacent membrane segments and which have a parabolic or approximately parabolic curvature.

2. Membrane concentrator mirror according to claim 1, characterized in that the clamping devices comprise a U-profile structure to be fixed to the clamping profile, that an elastic rod is surrounded by said outer rim of said membrane segments, and that said elastic rod is inserted in said U-profile structure together with said outer rim of said membrane segment.

3. Membrane concentrator mirror according to claim 1, characterized in that the bottom wall consists of aluminum.

4. Membrane concentrator mirror according to claim 1, characterized in that the bottom wall is laminated with hard foam.

5. Membrane concentrator mirror according to claim 1, characterized in that the membrane sections are formed by a foil consisting of a fluor polymer, said foil being covered by a silver or aluminum layer.

6. Membrane concentrator mirror according to claim 1, characterized in that the membrane segment after clamping same by said clamping devices are stressed more in a tangential direction than in a radial direction.

7. Membrane concentrator mirror according to claim 1, characterized in that the clamping devices comprise an adhesive tape.

* * * * *